Inventor:
Rudolph Smid
By Stevens, Robert Kikns
Attorneys.

United States Patent Office 3,379,459
Patented Apr. 23, 1968

3,379,459
CONDUIT CLAMPING MEANS
Rudolph Smid, 2844 Shakespeare Ave.,
Chicago, Ill. 60647
Filed Feb. 16, 1967, Ser. No. 616,657
2 Claims. (Cl. 285—158)

ABSTRACT OF THE DISCLOSURE

An electrical outlet box or the like in combination with a tubular, tapered, externally threaded, slotted clamp screw in which openings of the box are normally closed by knock-out blanks and which includes planar outer surfaces on the exterior walls facilitating assembling the boxes in gangs, the openings in the walls being surrounded by a planar surface and being formed by a rounded indentation for guiding the screw into the opening, and the rounded indentations terminating at the base of a complete pitch of a square thread formed by the edge of the opening and extending axially away from the indentation.

---

My invention relates to electric conduits which extend from current outlet boxes, and more particularly to the means for securing such conduits to the outlet boxes. While devices have been in use for this purpose with a high degree of efficiency, they are in most instances made with several parts and require the cutting of threads, the application of a nut on the inside of the outlet box, and of a second nut on the outer part of the clamp. As a result, the cost of outlet box equipment and labor in connection with the same is often an important factor in the installation or replacement of electric service.

A primary object of the present invention is to provide in an electrical outlet box a novel opening in combination with a clamp screw whereby the box opening lends itself to assembly in gangs, and the screw is guided into threaded relationship in the opening and is retained and maintained therein in a stable relationship, and in which the parts may be readily disassembled for maintenance and repair.

Other objects of the invention in conformance with that set forth above is to provide in a tapered clamping sleeve means for orienting a tube to be clamped therein, and means facilitating the deformable clamping of the clamping screw, as well as providing a clamping screw that can be readily cast without subsequent machining.

A better understanding of the invention may be gained by reference to the accompanying drawing, in which—

Figure 1:
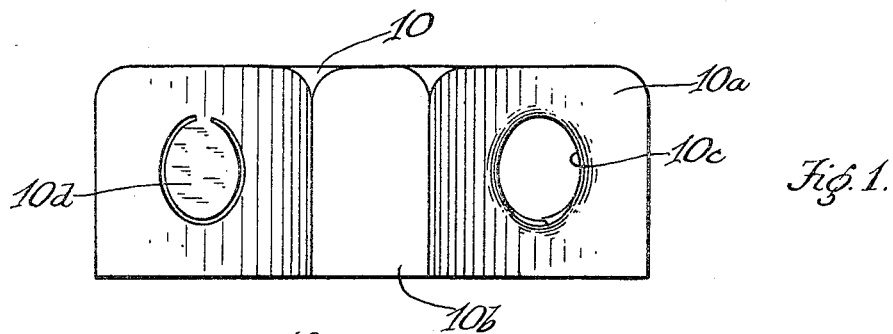
FIG. 1 is an elevation of a corner of the outlet box, with one conduit opening closed and another clear for the insertion of a conduit.
Figure 2:
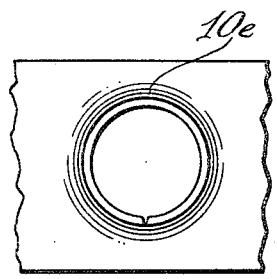
FIG. 2 is a fragmental elevation of one wall of the outlet box with the clear opening.
Figure 3:
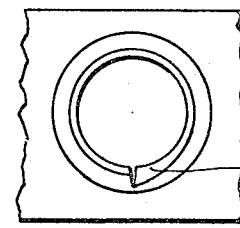
FIG. 3 is a similar view from the inside of the outlet box.
Figure 4:
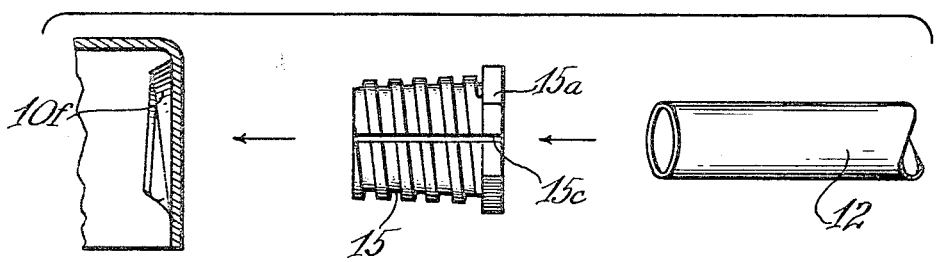
FIG. 4 is a group illustration of an outlet box wall in section, a clamping element in elevation, and the conduit in perspective, with arrows indicating the direction for assembling these parts.
Figure 6:
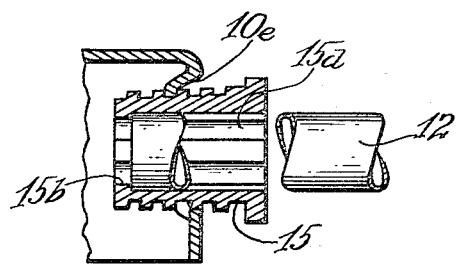
FIG. 6 is a section showing the clamping means assembled with the outlet box wall and the conduit.

Referring specifically to the drawing, 10 denotes a conventional outlet box, which usually has four side walls 10a and flat corner portions 10b. The top and side walls contain openings 10c originally filled with knock-out blanks 10d, one such blank being indicated in the left-hand portion of FIG. 1. Selected openings are cleared for the insertion of conduits, the end portion of such a conduit being shown at 12 in FIGS. 4 and 6.

Since outlet boxes come stamped with the openings and knock-out blanks filling the same, the present invention utilizes this facility to make a minor alteration in the outlet box openings for the application of a novel clamping element which may be produced in one piece by die-casting and operated by a single movement from the outside of the outlet box to firmly clamp the conduit to the same.

To be altered as stated, each wall of the outlet box is indented roundedly from the outside, as indicated at 10e, to form the opening 10c; and the rim of the opening is extended in inward direction as a tapped receptacle when the outlet box is stamped to form a square or Acme thread 10f. The space in the inner end of the receptacle is filled by the knock-out blank 10d in the usual manner, as shown in the left-hand portion of FIG. 1.

The clamping element has the general form of a screw 15 with a hexagonal head 15a at the front end, the screw being slightly tapered toward its rear end; and the screw is developed on the outside with a wide Acme thread matching the thread 10f of the outlet box openings. The screw 15 is tubular, and its inner diameter is suitable for the sliding insertion of the conduit 12 in the direction indicated in FIG. 4 to the limit formed by an internal rim flange 15b at the rear end of the screw.

Figure 5:
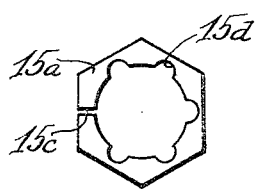
FIG. 5 is a front end view of the clamping element.

When the screw and conduit have been assembled as just indicated, the screw may be threaded into a selected opening of the outlet box in the usual manner after the knock-out blank 10d has been removed. The wall of the screw has a longitudinal split 15c at one side, which permits the gradual constriction of the screw as it is advanced, with a gripping effect on the conduit. The screw is made more flexible for the constricting action by having its wall made with a series of longitudinally-directed flutes 15d on the inside, as clearly indicated in FIG. 5. The design of the screw permits its fabrication by die-casting in a single operation and without machine work or manual attention.

The basic principle of the present clamping means, that is, the constriction of a split cone by threading it into a nut, is quite familiar. However, the environment of the present clamping means, and the intent to reduce parts and labor for it to a minimum, have created changes in the application of the basic principle. Thus, the screw in order to be produced efficiently by die-casting is made with the wide and massive Acme thread. A simple opening in the relatively-thin wall of the outlet box would lack the stock for a meshing engagement by the clamp thread. Therefore, one way to provide a sufficient bearing for the screw would be to weld a ring for extending the opening inwardly or outwardly, and to tap the extended opening with a thread. Obviously, this addition and operation—which would be necessary for all the outlet box openings—would make the price of the outlet box prohibitive and therefore meet with disfavor. The present invention solves the problem of a suitable tapped receptacle for the clamp by pressing the stock of the outlet box walls inwardly with the indentations 10e to a desired depth in the form of the deep, square-threaded receptacle 10f. A bearing of proper depth is therefore provided for meshing and constricting the screw 15 as it is advanced. Moreover, this adequate receptacle is created from the outlet box itself as it is pressed, without adding any part or operation. It is therefore apparent that the invention embodies a novel development in producing an outlet box with receptacles specially designed for the threading insertion of one-piece die-cast screws to clamp a conduit into selected openings of the outlet box.

While I have described the invention along specific lines, various minor changes or refinements may be made therein without departing from its principle, and I reserve the right to employ all such changes and refinements as may fall within the scope and spirit of the appended claims.

I claim:
1. In an electrical outlet box, in combination: at least one substantially flat wall having an outer planar portion surrounding a portion forming an opening therethrough, said opening including a rounded shoulder extending axially from said planar portion, said shoulder comprising the base of the inner edge of one complete pitch of a square thread extending axially away from said rounded shoulder and formed from the material defining the edge of said opening; and an axially tapered, externally threaded, tubular screw having a bore for receiving an axially disposed tube therein, said screw being removably received in said opening and being stably retained therein by said square thread and axial projection thereof, said screw threads being square and complementary to that surrounding said opening, said screw having a longitudinal, through slit opening from said bore to the outer surface of said screw whereby said screw is circumferentially constricted about a tube disposed therein to clamp the same as the screw is threaded into said opening, said screw including a polygonal head at the end opposite said threaded end for receiving a wrench or the like thereon, said screw including a plurality of longitudinally extending, circumferentially spaced flutes on the inside thereof for facilitating said clamping constriction, said polygonal head including a plurality of angularly related surfaces, said flutes being disposed intermediately of said surfaces and defining thinned-out areas thereat whereby said screw will constrict along its entire length and at said thinned-out areas.

2. The combination as claimed in claim 1 in which said tubular screw includes an internal stop portion at one end for limiting the endwise insertion of said tube.

References Cited
UNITED STATES PATENTS

| | | | |
|---|---|---|---|
| 947,185 | 1/1910 | McBean | 285—219 X |
| 1,888,343 | 11/1932 | Bohlman et al. | 285—382.7 |
| 2,357,754 | 9/1944 | Moll | 285—219 X |
| 2,445,358 | 7/1948 | Maechtlen et al. | 285—158 |
| 2,490,620 | 12/1949 | Cole et al. | 285—382.7 X |

CARL W. TOMLIN, *Primary Exxaminer.*

D. W. AROLA, *Assistant Examiner.*